May 17, 1927.

C. MARCH

TRAP

Filed Sept. 8, 1926

1,629,402

Carl March
INVENTOR

BY *Victor J. Evans*
ATTORNEY

Patented May 17, 1927.

1,629,402

UNITED STATES PATENT OFFICE.

CARL MARCH, OF CHICAGO, ILLINOIS.

TRAP.

Application filed September 8, 1926. Serial No. 134,317.

This invention relates to traps, and more particularly to a trap for flies, roaches and other crawling insects, which is simple in construction, and designed to efficiently carry out the purpose for which it is intended, the invention residing in the construction, combination and arrangement of parts as claimed.

In the drawing forming part of this application like numerals of reference indicate similar parts in the several views and wherein.

Figure 1:
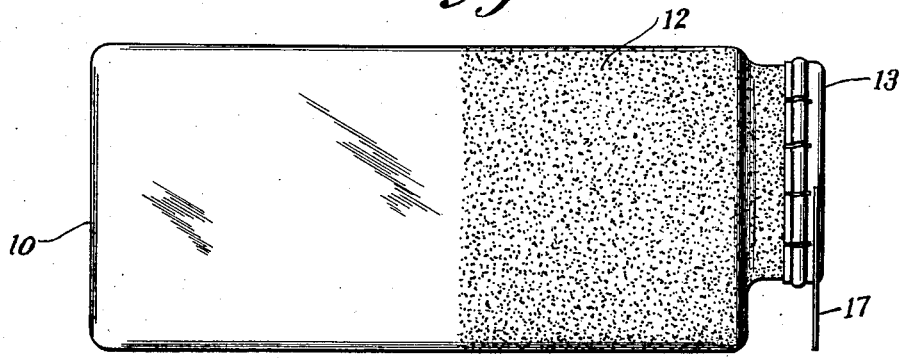
Figure 1 is a side elevation of the invention.
Figure 2:
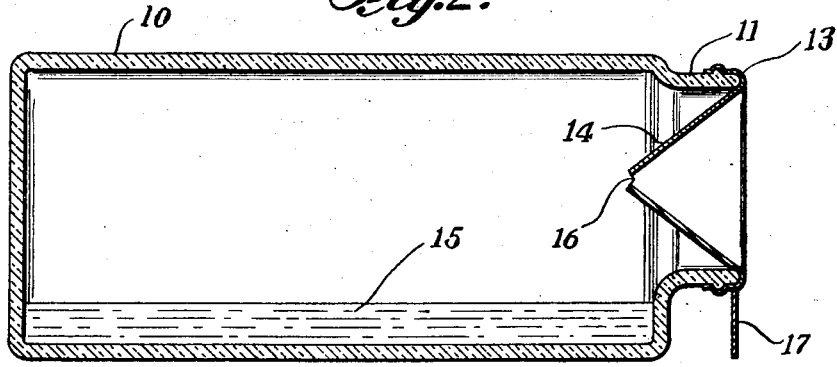
Figure 2 is a longitudinal sectional view therethrough.
Figure 3:
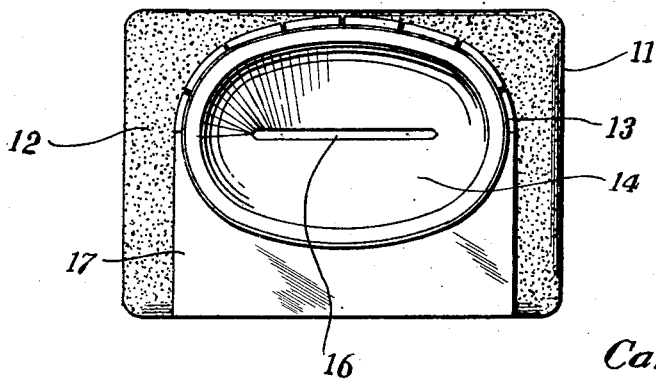
Figure 3 is an end elevation.

The trap forming the subject matter of the present invention embodies a receptacle 10 which may be constructed from any suitable material, and vary in size and shape without departing from the spirit of the invention. The receptacle is preferably in the nature of a jar constructed of glass or other transparent material and including a neck portion 11. As clearly illustrated in Figure 1, a portion of this jar or receptacle is frosted or roughened as at 12, to allow ants or other crawling insects, to crawl about the receptacle or jar 10 more freely than would otherwise be possible if the jar was perfectly smooth throughout its entire length. The mouth of the jar is closed by a cap 13 which is formed with a cone arranged to project an appreciable distance within the jar as illustrated in Figure 2. The jar is adapted to contain milk or other liquid indicated at 15, which serves as a bait for the insects. The cone 14 is provided with an elongated slot 16 through which the insects pass in entering the receptacle 10 in order to gain access to the liquid 15, and the size of this slot is such as to prohibit the insects from escaping from the receptacle after they once enter the latter.

If desired the cap 13 may be provided with a depending wall 17 which terminates flush with one side of the jar or receptacle to engage the support upon which the receptacle or jar may be mounted. While the receptacle or jar may be of any desired cross sectional contour, it is provided with a flat side so that it can rest firmly upon a suitable support. The wall 17 also assists in supporting the receptacle firmly upon a support, but it is primarily intended to provide means for allowing the insects to crawl up into the conical-shaped member or cone 14. The invention is very simple in construction and can be manufactured and sold at a nominal cost.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

An insect trap comprising a jar of uniform diameter throughout the major portion of its length, and including a transparent portion and a roughened substantially opaque portion, said receptacle being adapted to be partly filled with liquid, a reduced neck formed on one end of the jar, a cap threaded on said neck and formed with a conical-shaped portion projecting within the jar and having an elongated slot along the reduced end thereof, and a wall depending from said cap at a right angle to said neck and terminating flush with one side of the jar to repose upon the support upon which the jar is mounted.

In testimony whereof I affix my signature.

CARL MARCH.